(12) United States Patent
Wang et al.

(10) Patent No.: US 9,747,551 B2
(45) Date of Patent: Aug. 29, 2017

(54) DETERMINING AND LOCALIZING ANOMALOUS NETWORK BEHAVIOR

(71) Applicant: Pivotal Software, Inc., Palo Alto, CA (US)

(72) Inventors: Teng Wang, Davis, CA (US); Chunsheng Fang, Redwood City, CA (US); Derek Chin-Teh Lin, San Mateo, CA (US)

(73) Assignee: Pivotal Software, Inc., San Francisco, CA (US)

( * ) Notice: Subject to any disclaimer, the term of this patent is extended or adjusted under 35 U.S.C. 154(b) by 325 days.

(21) Appl. No.: 14/499,693

(22) Filed: Sep. 29, 2014

(65) Prior Publication Data
US 2016/0092774 A1   Mar. 31, 2016

(51) Int. Cl.
  *G06N 99/00*   (2010.01)
  *G06N 5/04*   (2006.01)
  *G06F 17/30*   (2006.01)
  *H04L 29/08*   (2006.01)
  *G06Q 10/10*   (2012.01)
  *G06Q 50/00*   (2012.01)

(52) U.S. Cl.
  CPC ......... *G06N 5/04* (2013.01); *G06F 17/30598* (2013.01); *G06N 99/005* (2013.01); *G06Q 10/10* (2013.01); *G06Q 50/01* (2013.01); *H04L 67/22* (2013.01)

(58) Field of Classification Search
  CPC .................................................. G06N 99/005
  See application file for complete search history.

(56) References Cited

U.S. PATENT DOCUMENTS

| 9,166,993 | B1* | 10/2015 | Liu ..................... H04L 63/1425 |
| 2003/0020764 | A1 | 1/2003 | Germain et al. |
| 2014/0122706 | A1 | 5/2014 | Boerner et al. |
| 2015/0286783 | A1* | 10/2015 | Kumar .................. G06F 19/327 705/2 |

FOREIGN PATENT DOCUMENTS

| EP | 1 545 054 | 6/2005 |
| EP | 2 597 601 | 5/2013 |

OTHER PUBLICATIONS

V. Chandola et al., "Anomaly Detection: A Survey", ACM Comp. Surveys, vol. 41, No. 3, article 15, Jul. 2009, 58 pages.*

(Continued)

*Primary Examiner* — Vincent Gonzales
(74) *Attorney, Agent, or Firm* — Fish & Richardson P.C.

(57) ABSTRACT

Methods, systems, and apparatus, including computer programs encoded on computer storage media, for detecting and localizing anomalies in large data sets. One of the methods includes identifying a user whose behavior is classified as anomalous during a particular time interval and determining observed community feature values for a community of users of which the user is a member. If observed user feature values are consistent with the observed community feature values, the behavior of the user is classified as not anomalous. If the observed user feature values are not consistent with the observed community feature values, the behavior of the user is classified as anomalous.

20 Claims, 7 Drawing Sheets

(56) References Cited

OTHER PUBLICATIONS

R. Xu and D. Wunsch, "Survey of Clustering Algorithms", IEEE Trans. on Neural Nets., col. 16, No. 3, May 2005, pp. 645-678.*
J. Qian et al., "Anomalous Cluster Detection", 2014 IEEE Int'l Conf. on Acoustics, Speech, and Sig. Proc., pp. 3854-3858.*
International Search Report and Written Opinion in International Application No. PCT/US2015/051451, mailed Dec. 9, 2015, 13 pages.

* cited by examiner

DETERMINING AND LOCALIZING ANOMALOUS NETWORK BEHAVIOR

BACKGROUND

This specification relates to detecting anomalies in large data sets.

Techniques for detecting anomalies in large data sets can be used in multiple areas of application, including computer network security, health care, and financial services. Many approaches to detecting anomalies in large data sets use a sequence of graphs that represent relationships in the data in each of multiple time intervals. The sequence of graphs is analyzed to detect when a graph from a particular time period is anomalous compared to other graphs in the sequence.

SUMMARY

This specification describes innovative techniques for determining and localizing anomalous behavior of an entity or a community of entities. An entity can be a user, a computer, or another user device, to name just a few examples. When the entity is a user, relationships between users based on their network activity can be represented as a user graph for each time interval. Rather than merely identifying a user graph in a time interval as anomalous, the techniques described below can identify a particular user or a particular community of users in a time interval as the source of the anomalous behavior. A distributed system can use user and community prediction models to reduce the false positive rates by determining whether a user's behavior is consistent with that of the user's community.

In general, one innovative aspect of the subject matter described in this specification can be embodied in methods that include the actions of identifying a user whose behavior is classified as anomalous during a particular time interval; determining observed community feature values for a community of users of which the user is a member, the community of users being defined by a partition of users in a user graph for the particular time interval, the user graph having nodes that represent distinct users and edges that represent relationships between users from user behavior of the users in the particular time interval; determining observed user feature values of the user during the particular time interval from the user graph for the particular time interval; determining whether the observed user feature values are consistent with the observed community feature values; classifying the behavior of the user as not anomalous when the observed user feature values are consistent with the observed community feature values; and classifying the behavior of the user as anomalous when the observed user feature values are not consistent with the observed community feature values. Other embodiments of this aspect include corresponding computer systems, apparatus, and computer programs recorded on one or more computer storage devices, each configured to perform the actions of the methods.

For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. The actions include determining that the observed user feature values of the user are not consistent with predicted user feature values of the user for the particular time interval. The actions include generating a community model using aggregate community feature values computed from a community graph having nodes that each represent a partition of a respective user graph within one of multiple time intervals, the community graph having edges between nodes that represent matching partitions of respective user graphs across adjacent time intervals, each user graph having nodes that represent distinct users and having edges that represent relationships between users from user behavior of the users in a particular time interval; determining predicted community feature values for the community, the predicted community feature values being generated by the community model; and determining that the predicted community feature values are consistent with the observed community feature values. The actions include generating a user model using user feature values of a node representing the user in one or more of the user graphs; and determining predicted user feature values for the user using the user model, wherein identifying a user whose behavior is classified as anomalous during a particular time interval comprises determining that the observed user feature values during the particular time interval are not consistent with the predicted user feature values during the particular time interval. Determining whether the observed user feature values are consistent with the observed community feature values comprises computing a vector distance between a first vector having the predicted observed user feature values and a second vector having the observed community feature values; and determining whether the vector distance satisfies a threshold. Determining whether the observed user feature values are consistent with the observed community feature values comprises generating a ranking of users according to a respective vector distance for each user, the vector distance for each user representing a measure of consistency of observed user feature values for the user with observed feature values of the user's respective community; and determining that the vector distance for the user is within a number of top-ranked users having the largest vector distances.

In general, another innovative aspect of the subject matter described in this specification can be embodied in methods that include the actions of receiving data representing aggregate community feature values of a community of users over time, the aggregate community feature values being computed from a community graph having nodes that each represent a partition of a respective user graph within one of multiple time intervals, the community graph having edges between nodes that represent matching partitions of respective user graphs from adjacent time intervals, each user graph having nodes that represent distinct users and edges that represent relationships between users from user behavior of the users in a particular time interval; determining predicted community feature values for the community, the predicted community feature values being generated by a community model trained on the aggregate community feature values of the community of users over time; determining that the predicted community feature values are not consistent with observed community feature values during a most recent time interval; and in response to determining that the predicted community feature values are not consistent with observed community feature values during a most recent time interval, classifying behavior of the community as anomalous during the most recent time interval. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. Determining that the predicted community feature values are not consistent with observed community feature values during a most recent time interval comprises computing a vector distance between a first vector having the predicted community feature values and a second vector having the observed community feature values; and determining that the vector distance satisfies a threshold. Determining that the predicted community feature values are not consistent with observed community feature values during a most recent time interval comprises generating a ranking of communities according to a respective vector distance for each community; and determining that the vector distance for the community is within a number of top-ranked communities having the largest vector distances. The actions include computing the aggregate community feature values from individual user feature values of distinct users in the community. Computing the aggregate community feature values comprises computing aggregate community feature values from multiple partitions of user nodes within a particular time interval, the multiple partitions being represented by nodes of a subgraph representing the community in the community graph.

The subject matter described in this specification can be implemented in particular embodiments so as to realize one or more of the following advantages. Anomalous behavior in a network can be localized to a specific user or a community of users. The observed activity of a user can be compared to the observed activity of the user's community to reduce the likelihood of a false positive classification of user behavior as anomalous.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes how a system can detect anomalies in large data sets and localize an anomaly to a single entity or to a subset of entities having a relationship in a system, which will be referred to as a community. The examples below will refer to data sets that represent user network activity in a computer network, but the same techniques can be applied equally to relationships between entities in other systems.

A system can detect anomalous network behavior by building models that predict the behavior of a single user and models that predict the aggregate behavior of the user's community. The system can then compare the observed user and community behavior with the predicted user and community behavior to detect and localize anomalies in the network. The system can also compare the observed user behavior to the observed community behavior in order to reduce false positive anomaly classifications.

To build models of predicted user and community behavior, a system can use as input a unipartite user graph from each of multiple time intervals. Each user graph has nodes that each represent a distinct user and edges that each represent a relationship between the users represented by the nodes connected by the edge. The system can generate edges to represent relationships from a variety of user behavior activity during the relevant time interval.

For example, an edge between two users, by which shorthand is meant as an edge between two nodes in the user graph that represent two users, can represent that both users accessed a same resource at least a threshold number of times during the relevant time interval. An edge may also represent that one user interacted in some way with another user during the relevant time interval, e.g., sent an email to the other user, connected with the other user in a social network, or accessed a web page maintained by the other user. When the nodes represent other entities, e.g., devices, the edges can represent an interaction between the devices. For example, an edge can represent a computer communicating with another computer.

Figure 1A:
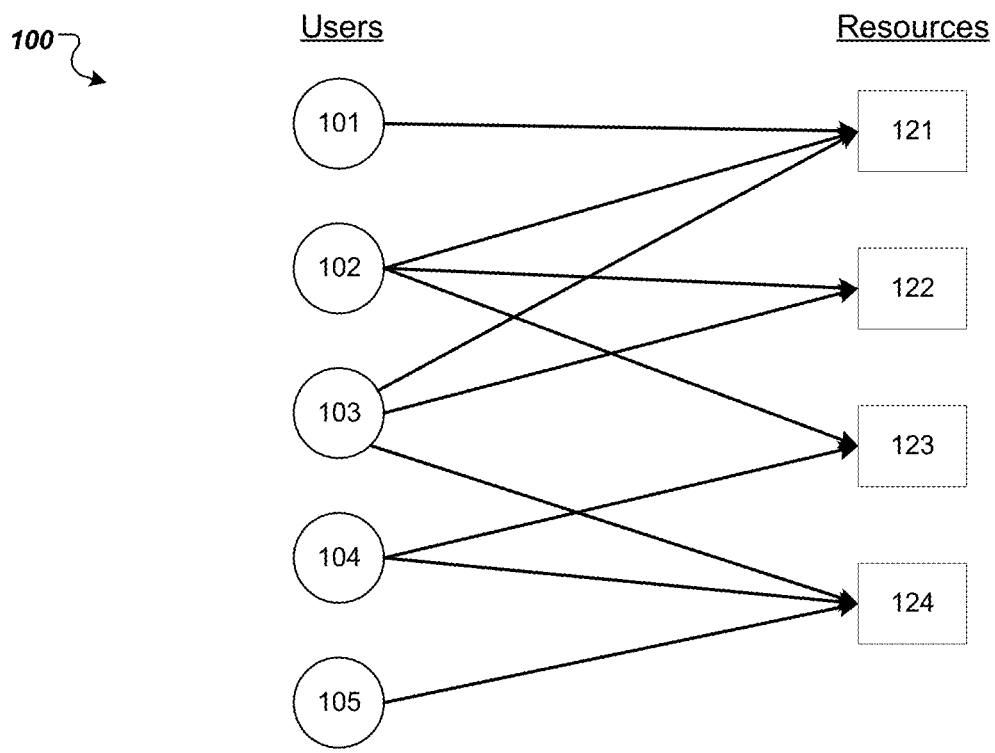
FIG. 1A illustrates a bipartite activity graph that represents users accessing resources in a network.

A system can generate unipartite user graphs from bipartite activity graphs. FIG. 1A illustrates a bipartite activity graph 100 that represents users accessing resources in a network. The nodes 101-105 on the left each represent a distinct user. The nodes on the right 121-124 each represent a distinct resource. An edge between a user node and a resource node represents that the user represented by the user node accessed the resource represented by the resource node during the relevant time interval.

Figure 1B:
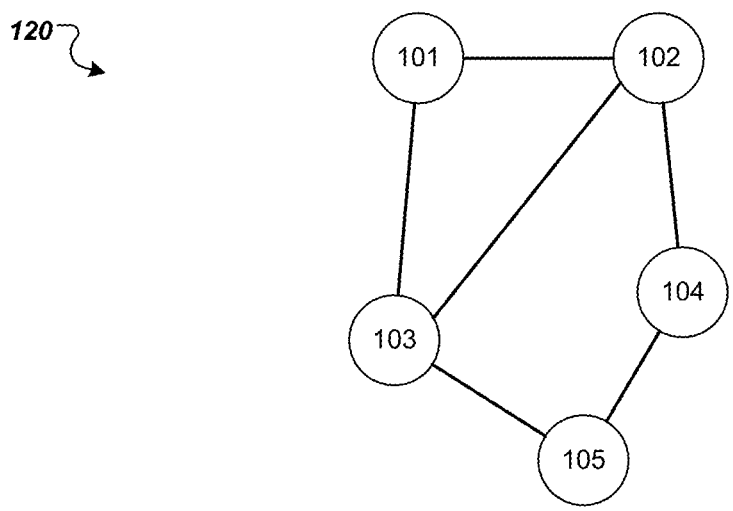
FIG. 1B illustrates a unipartite user graph generated from a bipartite activity graph.

FIG. 1B illustrates a unipartite user graph 120. The system can generate the user graph 120 from the bipartite activity graph 100. Alternatively, the system can obtain data representing the user graph 120, or from which the system builds the user graph 120, from other sources.

The nodes 101-105 in the user graph 120 represent distinct users. The user graph 120 is an undirected graph, and edges between the nodes represent that the corresponding users accessed a same resource at least a threshold number of times during the relevant time interval.

For example, the bipartite activity graph 100 represents that a user represented by the node 102 accessed the resources represented by nodes 121, 122, and 123. Users represented by the nodes 101, 103, and 104 also accessed those same resources. Thus, in the unipartite user graph 120, the node 102 has edges with the nodes 101, 103, and 104.

In some implementations, the system generates edges between nodes in the unipartite user graph 120 if the corresponding users accessed the same resource more than a threshold number of times. However, an edge may also represent access patterns for different resources. For example, two user nodes may have an edge when the corresponding users accessed common resources in the aggregate more than a threshold number of times. For example, the user graph 120 may have an edge when two users accessed at least 20 resources in common, or accessed common resources at least 20 times in the aggregate.

A distributed computing system that builds user and community behavior models from unipartite user graphs to detect and localize anomalies will now be described.

Figure 2:
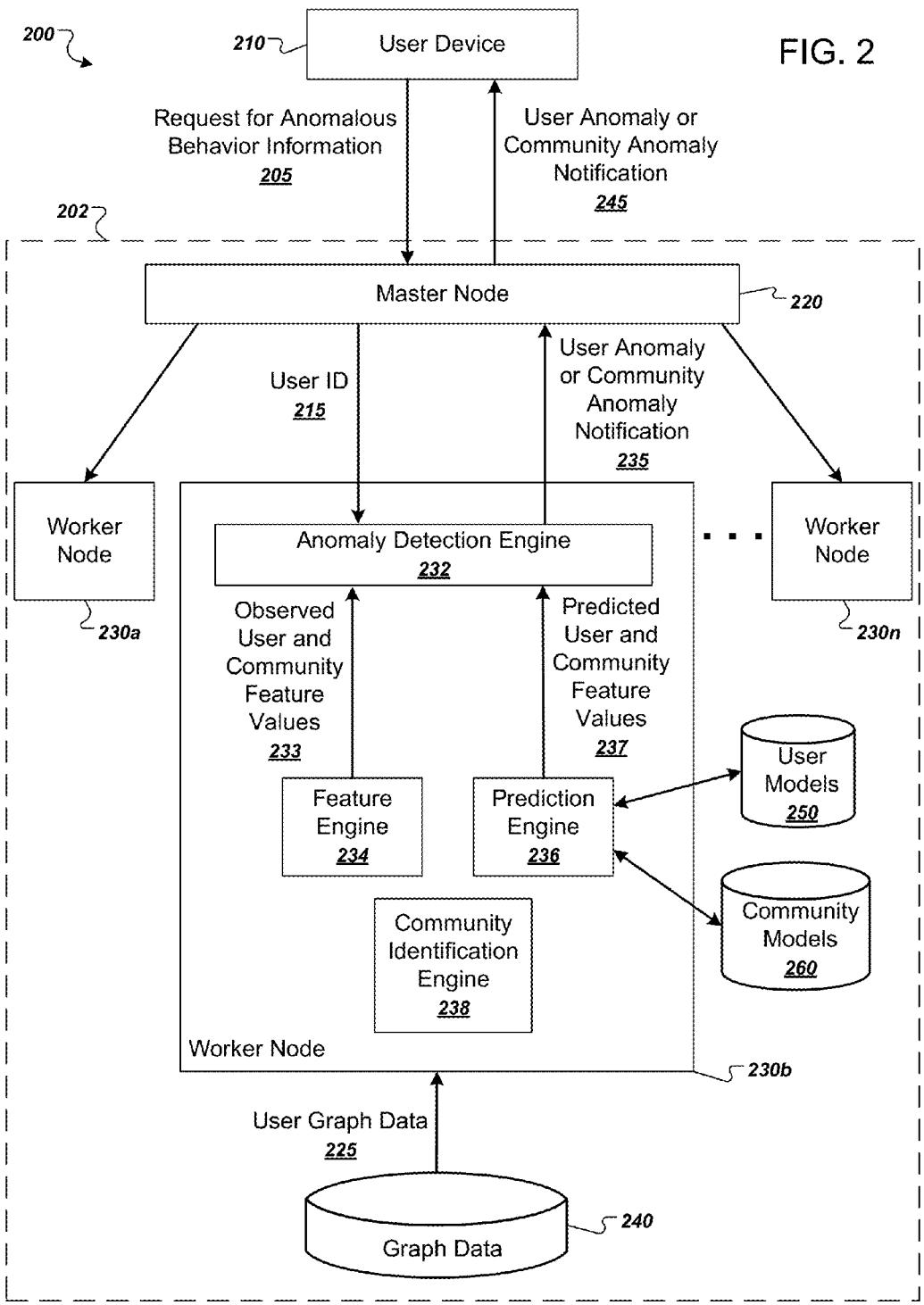
FIG. 2 illustrates an example system.

FIG. 2 illustrates an example system 200. The system 200 includes a distributed computing system 202, which is an example massively parallel processing (MPP) database management system. Other suitable systems include systems running Apache™ Hadoop®, which includes a Hadoop Distributed File System (HDFS) and implements a MapReduce programming model.

The distributed computing system 202 includes a master node 220 and multiple worker nodes 230a, 230b, through 230n. The master node 220 and each worker node 230a-n are each implemented as a physical computer host or a virtual machine on a physical computer host.

Each worker node 230a-n can receive user graph data 225 from a collection of graph data 240 and can write to and read from a collection of user models 150 and a collection of community models 260. Each worker node 230a-n has installed one or more of an anomaly detection engine 232, a feature engine 234, a prediction engine 236, and a community identification engine 138. Some or all of these components may also be installed on the master node 220.

The community identification engine 238 receives user graph data 225 and determines one or more communities within the user graph data 225, e.g., by assigning each node in the user graph to one of multiple communities. The community identification engine 238 can then provide the community data to the prediction engine 136 and the feature engine 234. Determining communities from user graph data will be described in more detail below with reference to FIG. 4.

The feature engine 234 generates user feature values for distinct users within a particular time interval as well as aggregate community feature values for a particular community within a particular time interval. The feature engine 234 can provide the computed features both to the anomaly detection engine 232 for detecting anomalies and to the prediction engine 236 for building user and community prediction models.

The prediction engine 136 generates a user model for each distinct user that occurs in the user graph data 225. The prediction engine also generates a community model for each distinct community identified in the user graph data 225. The user and community models can predict the user feature values or community feature values of the user or community within a subsequent time interval. The prediction engine 236 can store each user model in the collection of user models 250 and can store each community model in the collection of community models 260.

The anomaly detection engine 232 receives observed user and community feature values 233 for a user or a community within a particular time interval. The anomaly detection engine 232 also receives predicted user and community feature values 237. The anomaly detection engine can then determine whether a user or a community anomaly is present in the user graph data 225 for a particular time interval and provide an appropriate notification to the master node 220.

Multiple user devices can access the distributed computing system 202 to request information about user and community anomalies. A user of a user device 210 can submit a request for anomalous behavior information 205 by communicating with the master node 220. The master node 220 then coordinates with the worker nodes 230a-n to respond to the request for anomalous behavior information 205 by providing a user anomaly or community anomaly notification 245.

Before or after the request for anomalous behavior information 205 is received, the master node 220 assigns each worker node 230a-n to build a user model for each user of the system or building a corresponding community model for the user's community in the system. Thus, the master node 220 can direct the worker nodes 230a-n to build the user models and community models concurrently.

For example, the master node 220 can provide a user identifier 215 to the worker node 230b. The worker node 230b then obtains user graph data 225 and uses the feature engine 234, the prediction engine 236, and the community identification engine 238 to generate a user model for the user and a community model for the user's community. The worker node 230b can then store the models in the collection of user models 250 and the collection of community models 260 for use by other worker nodes in the system 202.

After the models are generated and after the request for anomalous behavior information is received 205, the master node 220 assigns each worker node 230a-n to work on detecting potentially anomalous behavior for a particular user or the user's community. Thus, the master node 220 can direct the worker nodes 230a-n to detect anomalies in the system concurrently.

For example, the master node 220 can provide the user identifier 215 to the worker node 230b. The worker node 230b will then use the user and community models to determine whether the behavior of the user corresponding to the user identifier 215, or the behavior by the user's community, was anomalous.

If the user's behavior or the user's community's behavior is anomalous, the anomaly detection engine can provide a user anomaly or a community anomaly notification 235 to the master node 220. The notification 235 will generally identify the user or the user's community responsible for the anomalous behavior. The master node 220 can then provide a corresponding user anomaly or community anomaly notification 245 back to the user device 210.

Figure 3:
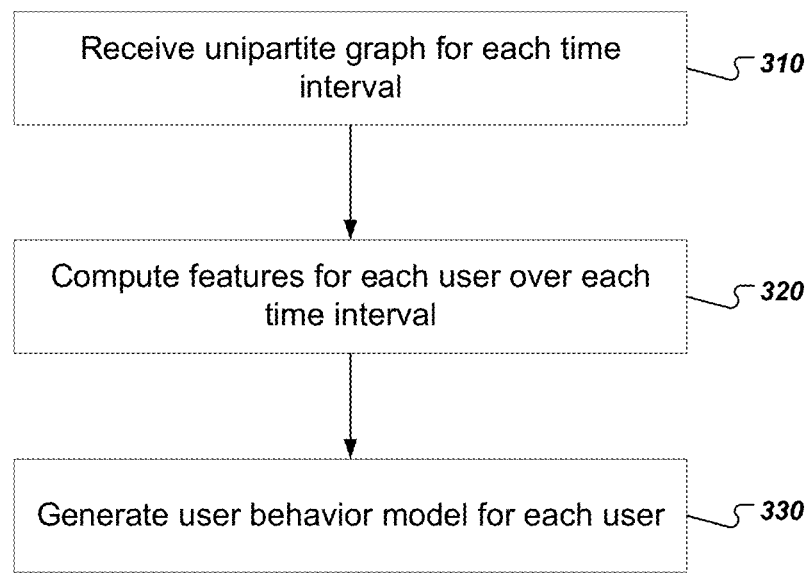
FIG. 3 is a flow chart of an example method for generating a user behavior model.

FIG. 3 is a flow chart of an example method for generating a user behavior model. The user behavior model can predict values of one or more user features that represent the user's activity. For convenience, the method will be described as being performed by a system of one or more computers, located in one or more locations, and programmed appropriately in accordance with this specification.

The system receives a unipartite user graph for each time interval (310). Each unipartite user graph represents relationships between users due to their activity in a network over each of multiple time intervals. For example, the system can receive a unipartite user graph that represents relationships between users due to activity that occurred over a particular day, week, month or year.

As shown in FIG. 2, the system computes user feature values for each user node over each time interval (320). From each unipartite user graph, the system can compute values for a number of user features for each user node. The system can use any appropriate features for representing the centrality or importance of the user node in the unipartite user graph.

One example user feature is the degree of the user node. The degree of the user node is the number of edges connected to the user node.

Another example user feature is a local clustering coefficient of the user node. The local clustering coefficient represents the degree to which the node is clustered together with its one or more neighboring nodes. For example, the system can compute the local clustering coefficient as the number of edges the user node has with its neighboring nodes divided by the number of edges that could possibly exist between the neighboring nodes. In some implementations, the system computes the local clustering coefficient $c_i$ using the set $\{e_{jk}\}$ of $k_i$ directly connected neighboring nodes having edges as:

$$c_i = \frac{2 \times |\{e_{jk}\}|}{k_i \times (k_i - 1)}.$$

Another example user feature is the closeness of the user node. The closeness of the user node is a representative measure of distance between the user to every other user node in the user graph. In some implementations, the system computes distances to each other node and then computes a measure of central tendency of the distances, e.g., an arithmetic mean, a geometric mean, a median, or a mode.

Another example user feature is the betweenness of the user node. The betweenness of the user node represents a number of times that the user node acts as a bridge along a shortest path between two other nodes. For example, the system can compute the shortest path between a number of nodes the user graph and determine how many times the user node occurred along the shortest path.

Another example feature is an eigenvector centrality of the user node. The eigenvector is a measure of influence of the user node in the network. The system can compute the eigenvector centrality of the user node by computing a measure of the number of and quality of edges to the user node. The quality of an edge from another node depends on the number of and quality of edges to that other node. The system can also use a PageRank or a Katz centrality score as a feature for the user node.

The system generates a user behavior model for each user (330). The system can leverage a distributed system with many worker nodes to compute user feature values for each of the users in the user graph in each time interval concurrently and then compute a user model for each user. For example, a master node, e.g., the master node 220 can assign, to each worker node in the distributed system, a particular number of users.

In general, the user behavior model for a particular user represents the evolution over time of the user feature values of the user node. The system can then use the model to generate predicted user feature values for a future time interval t+1. The system can use any appropriate statistical or machine-learned model to generate predicted user feature values for the user.

In some implementations, the system represents a user graph for each time interval $G_t$ as a matrix given by $$G_t = \begin{bmatrix} g_{11,t}, g_{12,t}, \dots, g_{1m,t} \\ g_{21,t}, g_{22,t}, \dots, g_{2m,t} \\ \dots \\ g_{n1,t}, g_{n2,t}, \dots, g_{nm,t} \end{bmatrix},$$

where each $g_{ij,t}$ value represents the value of the ith feature for the jth user during time interval t. The system can then use a vector autoregression (VAR) in time series analysis to generate a model that represents the evolution of the user feature values over time.

Thus, the system can represent the user feature values for the ith user in the user graph during a time interval t as:

$$G_t^{(i)} = c + A_1 G_{t-1}^{(i)} + A_2 G_{t-2}^{(i)} + \dots + A_p G_{t-p}^{(i)} + e_t,$$

which can be expressed in matrix form as:

$$\begin{bmatrix} g_{1i,t} \\ g_{2i,t} \\ \dots \\ g_{ni,t} \end{bmatrix} = \begin{bmatrix} c_1 \\ c_2 \\ \dots \\ c_n \end{bmatrix} + \begin{bmatrix} a_{1,1}^1, a_{1,2}^1, \dots, a_{1,n}^1 \\ a_{2,1}^1, a_{2,2}^1, \dots, a_{2,n}^1 \\ \dots \\ a_{n,1}^1, a_{n,2}^1, \dots, a_{n,n}^1 \end{bmatrix} \begin{bmatrix} g_{1i,t-1} \\ g_{2i,t-1} \\ \dots \\ g_{ni,t-1} \end{bmatrix} + \dots +$$

$$\begin{bmatrix} a_{1,1}^p, a_{1,2}^p, \dots, a_{1,n}^p \\ a_{2,1}^p, a_{2,2}^p, \dots, a_{2,n}^p \\ \dots \\ a_{n,1}^p, a_{n,2}^p, \dots, a_{n,n}^p \end{bmatrix} \begin{bmatrix} g_{1i,t-p} \\ g_{2i,t-p} \\ \dots \\ g_{ni,t-p} \end{bmatrix} + \begin{bmatrix} e_{1,t} \\ e_{2,t} \\ \dots \\ e_{n,t} \end{bmatrix}.$$

The vectors $G_{t-p}^{(i)}$ represent the computed user feature values in previous time intervals. The vector c represents a vector of constants, and the vector $e_t$ represents a vector of error terms. The system can train the model by computing values for each matrix $A_t$ of model parameters.

After training the model, the system can use the trained model parameters to compute the predicted user feature values $\hat{G}_{t+1}^{(i)}$, in time interval t+1 by computing:

$$\hat{G}_{t+1}^{(i)} = c + A_0 G_t^{(i)} + A_1 G_{t-1}^{(i)} + \dots + A_{p-1} G_{t-p+1}^{(i)} + e_t,$$

with all of the values for each matrix $A_t$ of model parameters having been computed during training.

Figure 4:
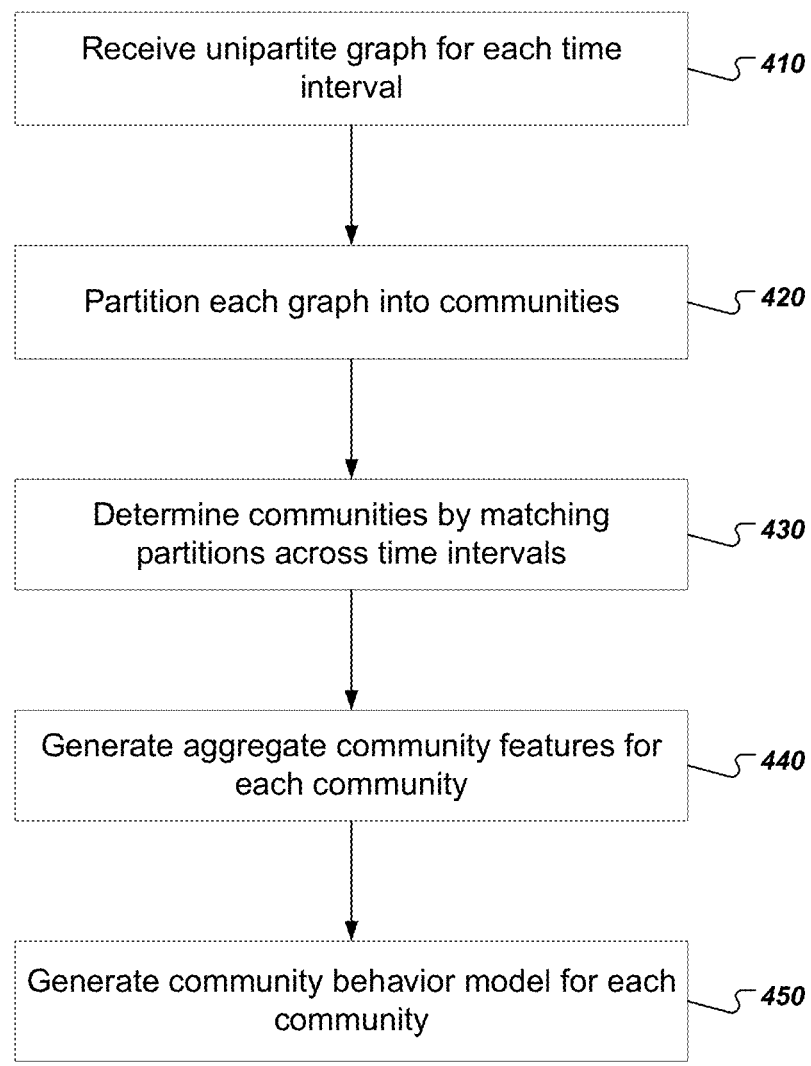
FIG. 4 is a flow chart of an example method for generating a community behavior model.

FIG. 4 is a flow chart of an example method for generating a community behavior model. The community behavior model can predict values of one or more community features that represent the aggregate activities of a particular subgroup of users. For convenience, the method will be described as being performed by a system of one or more computers, located in one or more locations, and programmed appropriately in accordance with this specification.

The system receives a unipartite user graph for each time interval (410). As described above with reference to FIG. 3, the unipartite user graph has nodes that represent distinct users and edges between nodes representing a relationship between users based on network activity of the users during a particular time interval.

The system partitions each user graph into partitions (420). The system can use any appropriate graph partitioning process to generate subgraphs that each represent a community. In some implementations, the system uses a fast greedy optimization of the modularity of the graph structure. Suitable graph partitioning approaches are described in more detail in A. Clauset, M. E. Newman, and C. Moore, *Finding Community Structure in Very Large Networks*. Physical Review E 70(6):066111 (2004) and in Blondel et al., *Fast Unfolding of Communities in Large Networks*, J. Stat. Mech. (2008).

Each partition may represent a distinct user community of users in the system. The partitions may be partially overlapping or non-overlapping. Multiple distinct partitions within a single time interval may actually belong to the same community, which will be described in more detail below.

Figure 5:
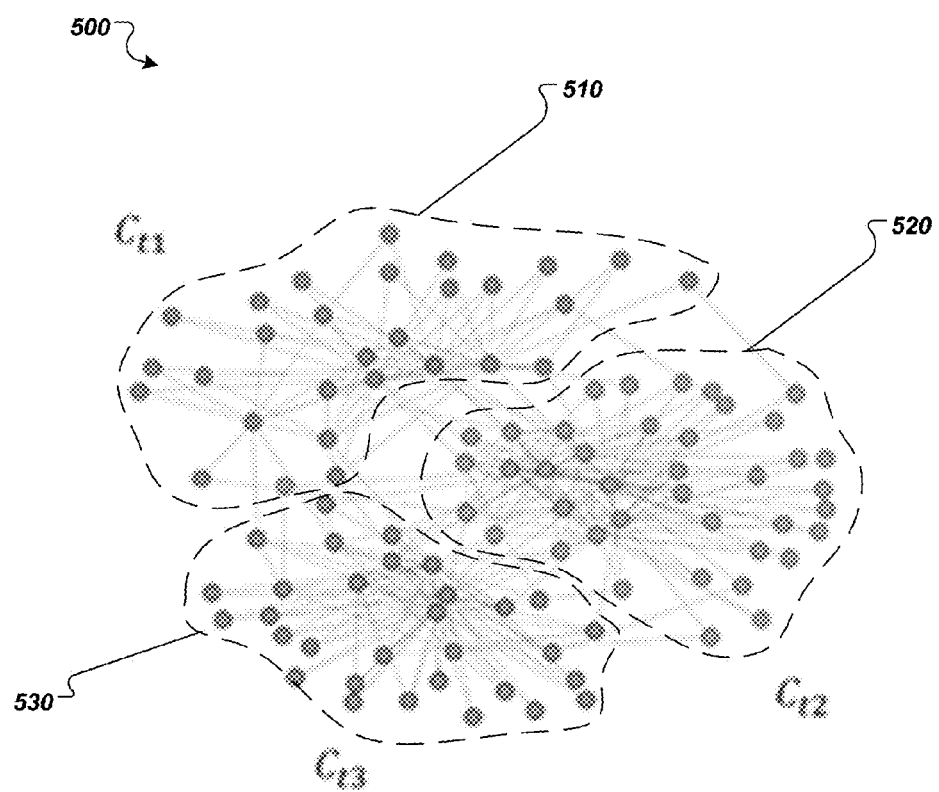
FIG. 5 illustrates an example partitioning of a user graph into distinct partitions.

FIG. 5 illustrates an example partitioning of a user graph 500 into distinct partitions. The user graph 500 represents user relationships for a particular time interval t. The user graph has been partitioned into three partitions 510, 520, and 530.

As shown in FIG. 4, the system determines communities by matching partitions across time intervals (430). One objective of the community behavior model is to model the evolution of community features of a particular community over time. To do so, the system can determine which subgroups of users belong to a same community across multiple time intervals by matching partitions across the time intervals.

The system can determine partitions that match according to a measure of similarity between partitions in adjacent time intervals. The system can designate partitions having a measure of similarity that satisfies a threshold as matching partitions. In some implementations, the system computes a measure of similarity between two partitions $C_i$ in time interval t−1 and $C_1$ in an adjacent time interval t as:

$$sim(C_i, C_j) = \frac{|C_i \cap C_j|}{\min(|C_i|, |C_j|)},$$

where $|C_i \cap C_j|$ represents a number of users that Ci and Cj have in common and wherein $\min(|C_i|,|C_j|)$ represents the smaller of the number of users in $C_i$ or the number of users in $C_j$.

The system can match each partition in a time interval with partitions in previous or subsequent adjacent time intervals. The system can then generate a directed community graph that represents the evolution of communities over time. The nodes of the community graph represent generated partitions within each time interval. The edges of the community graph represent matching partitions.

Nodes of the community graph that belong to a same particular subgraph represent partitions of users that belong to a single community. Thus, the number of connected subgraphs in the community graph represents the number of communities.

Figure 6:
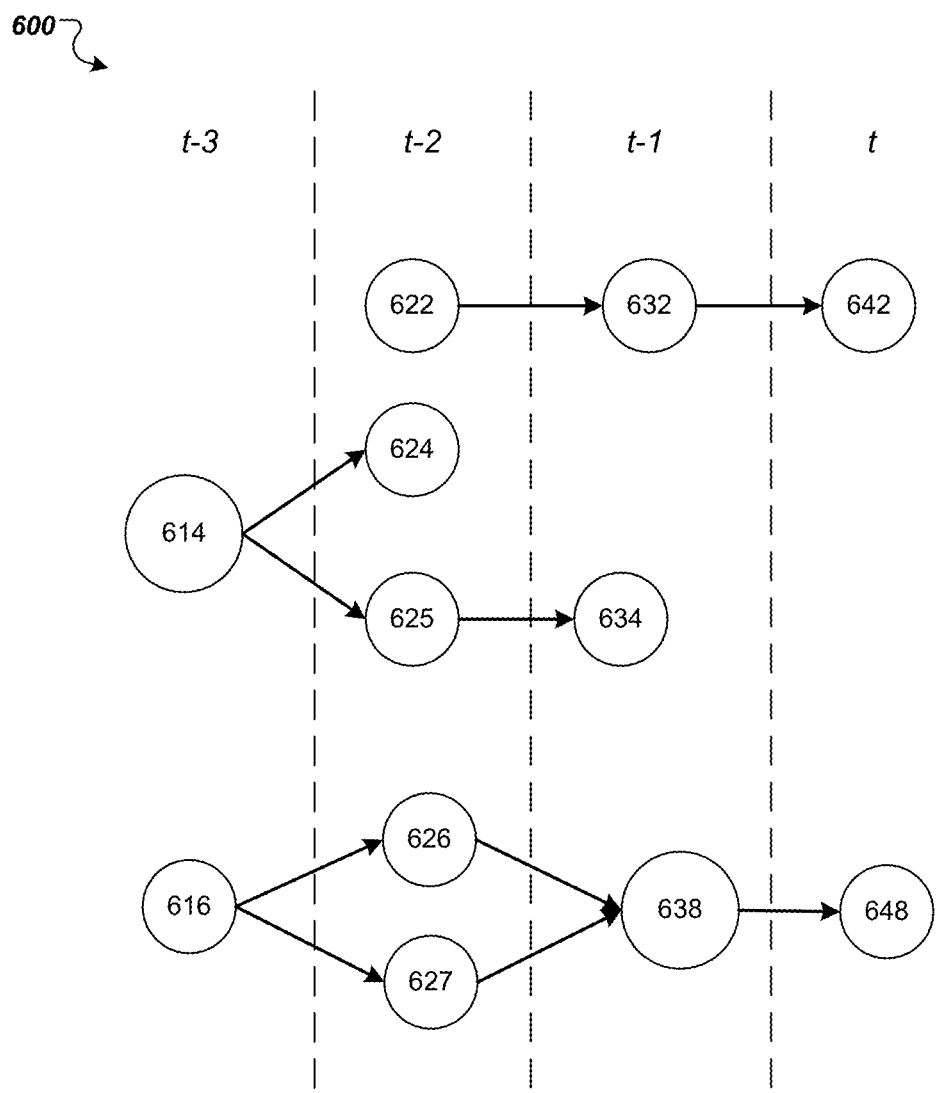
FIG. 6 illustrates a community graph.

FIG. 6 illustrates a community graph 600. The nodes of the community graph 600 represent partitions generated from a user graph for each time interval. The edges between the nodes represent partitions that match in adjacent time intervals.

For example, the partitions 614 and 616 were generated from a first user graph for the time interval t−3. The partitions 622, 624, 625, 626, and 627 were generated from a second user graph for the time interval t−2. The partitions 632, 634, and 638 were generated from a third user graph for the time interval t−1, and the partitions 642 and 648 were generated from a fourth user graph for the time interval t.

Each disconnected subgraph of the community graph 600 represents a distinct community of users. For example, the subgraph of the nodes 622, 632, and 642 represents a single community of users.

Matching partitions across time intervals can represent the emergence and disappearance of communities of users. For example, the partition for the node 622 did not match any partitions in the preceding time interval t−3. Thus, the node 622 represents the appearance of a new community in the user graph for t−2.

Conversely, the node 634 did not match any partitions in the subsequent time interval t. Thus, the absence of a matching partition in the time interval t represents the disappearance of the community from the user graph for t.

Different partitions within a time interval belong to a same community when the partitions converge or diverge. For example, the nodes 624 and 625 represent distinct partitions within the time interval t−2 that diverged from the partition represented by the node 614.

Conversely, the nodes 626 and 627 represent distinct partitions within the time interval t−2 that converged into the partition represented by node 638.

Partitions within a single community can converge and diverge multiple times. For example, the node 616 diverges into the nodes 626 and 627, which then converge into the node 638. All of these nodes thus belong to a single community represented by the corresponding subgraph of nodes.

As shown in FIG. 4, the system generates aggregate feature values for each community (440). After determining communities from matching partitions, the system can compute, within each time interval, aggregate feature values for each community.

The system can use the same user features as described above with reference to FIG. 3 to compute aggregate feature values for each community. For example, the system can compute an aggregate closeness value using closeness values computed for each user of the community during the relevant time interval. If multiple partitions within a particular time interval belong to a same community, the system can compute the aggregate feature values from users in the multiple partitions.

The system can compute any appropriate aggregate value for each feature. For example, the system can compute a measure of central tendency of the user feature values of users in the community, e.g., an arithmetic mean, a geometric mean, a median, or a mode. The system may also initially discard outliers before computing the aggregate value.

The system generates a community behavior model for each community (450). After computing the aggregate feature values for each community, the system can generate a model that can predict community feature values for the community in a future time interval.

The system can use VAR to represent the community feature values during a time interval t as:

$$G_t^{(c)} = c + A_1 G_{t-1}^{(c)} + A_2 G_{t-2}^{(c)} + \ldots + A_p G_{t-p}^{(c)} + e_t,$$

which can be expressed in a matrix form as described above with respect to FIG. 2.

The system can then train a model for each community that represents the evolution of the community feature values over time, for example, by generating values for each of the $A_t$ model parameters for the community.

After training the community model, the system can use the trained model parameters to compute the predicted community feature values $\hat{G}_{t+1}^{(i)}$, in time interval t+1 by computing:

$$G_{t+1}^{(i)} = c + A_0 G_t^{(c)} + A_1 G_{t-1}^{(c)} + \ldots + A_{p-1} G_{t-p+1}^{(c)} + e_t,$$

Figure 7:
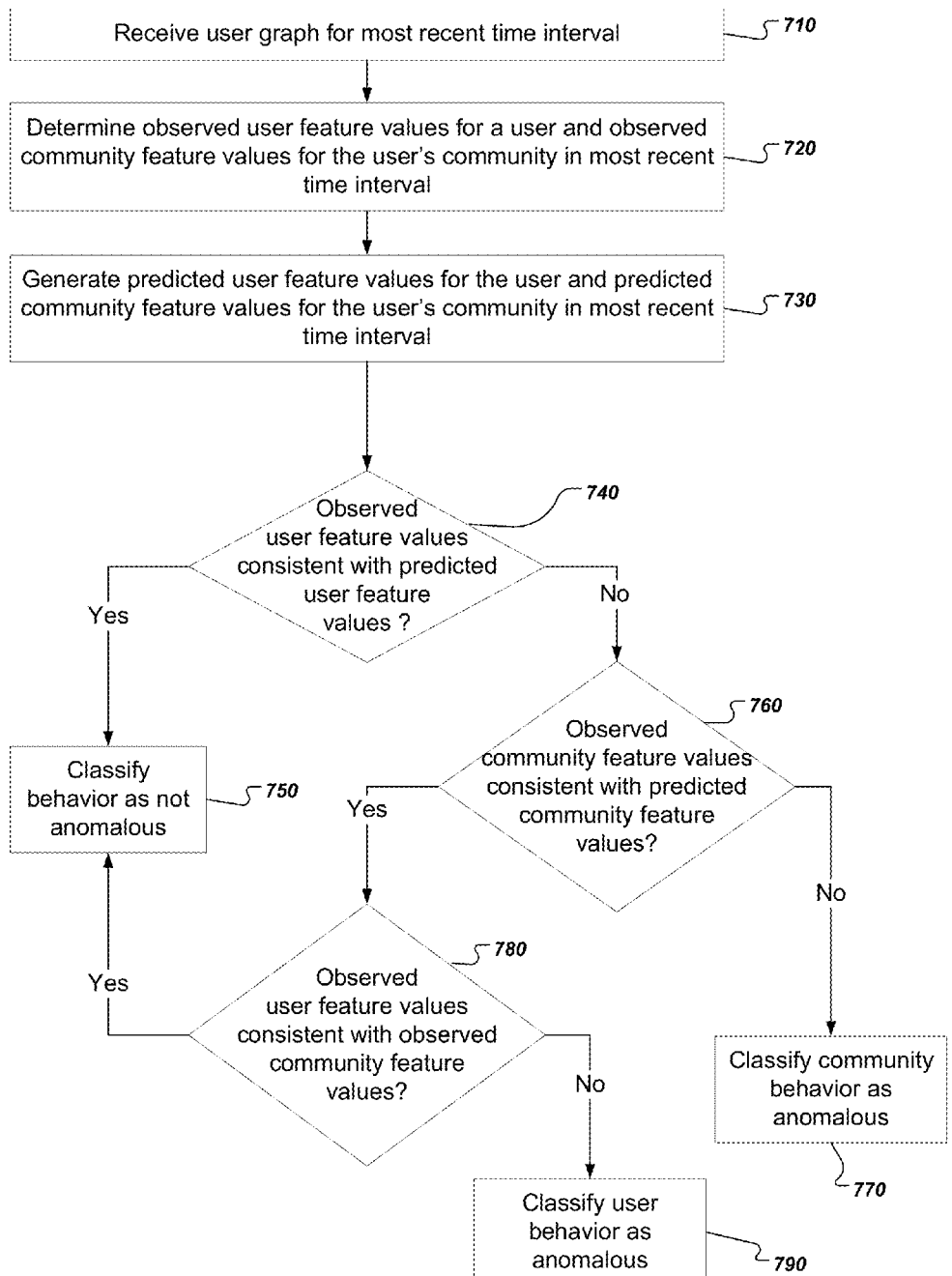
FIG. 7 is a flow chart of an example method for generating a community anomaly alert or a user anomaly alert.

FIG. 7 is a flow chart of an example method for generating a community anomaly alert or a user anomaly alert. A system can use the user behavior model and community behavior model to determine whether the user's behavior is anomalous, the community's behavior is anomalous, or neither. For convenience, the method will be described as being performed by a system of one or more computers, located in one or more locations, and programmed appropriately in accordance with this specification.

The system receives a user graph for a most recent time interval (710). The system will commonly be determining anomalous behavior of the user or community for a most recent time interval for which data is available. However, the system can also determine anomalous behavior for other time intervals as well.

The system determines observed user feature values for a user and observed community feature values for the user's community in the most recent time interval (720). A particular worker node in a distributed system can receive a user identifier of a particular user whose behavior is to be examined.

The system can then compute observed user feature values for the user as described above with reference to FIG. 3. The system can then determine which partitions of the user graph belong to the user's community and compute observed community feature values as described above with reference to FIG. 4.

The system generates predicted user feature values for the user and predicted community feature values for the user's community the most recent time interval (730). The system can use the user behavior model generated for the user as described above with reference to FIG. 3 and the community behavior model generated for the user's community as described above with reference to FIG. 4. to generate the predicted feature values.

The system determines whether the observed user feature values are consistent with the predicted user feature values (740). The system can determine whether or not the observed user feature values are consistent with the predicted user feature values by computing a difference between the observed and predicted feature values and comparing the difference to a first threshold.

For example, the system can generate feature vectors for the observed and predicted user feature values and compute a vector distance between the feature vectors, e.g., a Euclidean distance.

In some implementations, the system computes the difference as the Frobenius norm of the vector difference between the observed and predicted user feature values as:

$$x_{t+1}^{(i)} = \left\| \hat{G}_{t+1}^{(i)} - G_{t+1}^{(i)} \right\|_F = \sqrt{\sum_{i=1}^{n} |\hat{g}_{1i,t+1} - g_{1i,t+1}|^2}.$$

The system can then compare the Frobenius norm to a first threshold to determine whether the observed user feature values are consistent with the predicted user feature values.

In some implementations, the first threshold is dynamic and is defined by a position of the user in a ranking of all differences for all users. For example, a master node of a distributed system can distribute user identifiers to multiple worker nodes. The worker nodes can compute the differences between the observed and predicted values for users to which they were assigned and return the differences to the master node.

The master node can then rank users according to the computed differences and consider a top percentage of users, e.g., users having the top 5%, 10%, or 20% highest differences as users having differences that satisfy the first threshold.

If the observed user feature values were consistent with the predicted user feature values, the system can classify the user's behavior as not anomalous (branch to 750). If the observed user feature values were not consistent with the predicted user feature values, the system can then compare the observed community feature values and predicted community feature values for the user's community (branch to 760).

For example, for users whose observed user feature values were not consistent with the predicted user feature values, the master node of the system can distribute community identifiers of communities to worker nodes in the system. The worker nodes of the system will then compare the observed and predicted community feature values for communities to which they were assigned.

The system determines whether observed community feature values are consistent with predicted community feature values (branch to 760). The system can similarly generate feature vectors using the predicted and observed community feature values and compute a vector distance using an appropriate distance metric, e.g., the Frobenius norm.

The second threshold can also be dynamic and can be based on a second ranking of differences for all communities during the particular time interval. A master node of the system can receive the computed differences for all the communities in the time interval, rank the communities by the computed differences, and consider a top percentage of communities, e.g., the top 5%, 10%, or 20%, as having a difference that satisfies the threshold.

If the observed community feature values are not consistent with the predicted community feature values, the system classifies the community behavior as anomalous (branch to 770). For example, the system can generate a community anomaly notification. The community anomaly notification indicates that the behavior of the community of users deviates significantly from its normal behavior. The indication of a community anomaly can indicate the presences of a coordinated attack by the community of users, e.g., a distributed denial-of-service attack.

The system can provide the community anomaly notification to a system administrator so that the administrator can investigate or take appropriate action to mitigate or prevent damage to the system.

If the observed community feature values were consistent with the predicted community feature values, the system can then determine whether a third difference between the observed user feature values and observed community feature values satisfies a third threshold (branch to 780). In other words, the system can determine whether the observed behavior of the user aligned with the observed behavior of the user's community. This check can reduce the number of false positives generated for users whose behavior is considered anomalous in isolation. If anomalous in isolation, but aligned with the user's community, the system can consider the indication that the user's behavior was anomalous as a false positive and classify the user's behavior as not anomalous (branch to 750).

For example, in the most recent time interval a particular user may make several connections to a new server in the system in a way that deviates significantly from the user's predicted behavior. However, this may be due to an unusual system failure that required the user to connect to the new server. This may be indicated by the observed user values being similar to the observed community feature values of other users in the user's community. Thus, if the connections to the new server are consistent with connections to the new server by other users in the user's community, the system will classify the user's behavior as not anomalous.

If the observed user feature values were not consistent with the observed community feature values, the system classifies the user's behavior as anomalous (branch to 790).

The system can generate a user anomaly notification that indicates that the behavior of the user deviates from his or her normal behavior as well as from the behavior of the user's community. The system can then provide the user anomaly notification to a system administrator so that the administrator can investigate or take corrective action.

Although the examples in this specification related to determining anomalous behavior from user activity in a network, the same techniques can also be applied in other technology areas, for example, to gene networks and communication networks.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

As used in this specification, an "engine," or "software engine," refers to a software implemented input/output system that provides an output that is different from the input. An engine can be an encoded block of functionality, such as a library, a platform, a software development kit (SDK), or an object. Each engine can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines may be implemented on the same computing device, or on different computing devices.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

Control of the various systems described in this specification, or portions of them, can be implemented in a computer program product that includes instructions that are stored on one or more non-transitory machine-readable storage media, and that are executable on one or more processing devices. The systems described in this specification, or portions of them, can each be implemented as an apparatus, method, or electronic system that may include one or more processing devices and memory to store executable instructions to perform the operations described in this specification.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A computer-implemented method comprising:
identifying a user whose behavior is classified as anomalous during a particular time interval;
determining observed community feature values for a community of users of which the user is a member, the community of users being defined by a partition of users in a user graph for the particular time interval, the user graph having nodes that represent distinct users and edges that represent relationships between users from user behavior of the users in the particular time interval;
determining predicted community feature values for the community, the predicted community feature values being determined from a community model generated using aggregate community feature values computed from a community graph having nodes that each represent a partition of a respective user graph within one of multiple time intervals, the community graph having edges between nodes that represent matching partitions of respective user graphs across adjacent time intervals;
determining that the predicted community feature values are consistent with the observed community feature values;
determining observed user feature values of the user during the particular time interval from the user graph for the particular time interval;
determining whether the observed user feature values are consistent with the observed community feature values;
classifying the behavior of the user as not anomalous when the observed user feature values are consistent with the observed community feature values; and
classifying the behavior of the user as anomalous when the observed user feature values are not consistent with the observed community feature values.

2. The method of claim 1, further comprising:
determining that the observed user feature values of the user are not consistent with predicted user feature values of the user for the particular time interval.

3. The method of claim 1, further comprising:
generating a user model using user feature values of a node representing the user in one or more of the user graphs; and
determining predicted user feature values for the user using the user model, wherein identifying a user whose behavior is classified as anomalous during a particular time interval comprises determining that the observed user feature values during the particular time interval are not consistent with the predicted user feature values during the particular time interval.

4. The method of claim 1, wherein determining whether the observed user feature values are consistent with the observed community feature values comprises:
computing a vector distance between a first vector having the observed user feature values and a second vector having the observed community feature values; and
determining whether the vector distance satisfies a threshold.

5. The method of claim 1, wherein determining whether the observed user feature values are consistent with the observed community feature values comprises:
generating a ranking of users according to a respective vector distance for each user, the vector distance for each user representing a measure of consistency of observed user feature values for the user with observed feature values of the user's respective community; and
determining that the vector distance for the user is within a number of topranked users having the largest vector distances.

6. A computer-implemented method comprising:
receiving data representing aggregate community feature values of a community of users over time, the aggregate community feature values being computed from a community graph having nodes that each represent a partition of a respective user graph within one of multiple time intervals, the community graph having edges between nodes that represent matching partitions of respective user graphs from adjacent time intervals, each user graph having nodes that represent distinct users and edges that represent relationships between users from user behavior of the users in a particular time interval;
determining predicted community feature values for the community, the predicted community feature values being generated by a community model trained on the aggregate community feature values of the community of users over time;

determining that the predicted community feature values are not consistent with observed community feature values during a most recent time interval; and in response to determining that the predicted community feature values are not consistent with observed community feature values during a most recent time interval, classifying behavior of the community as anomalous during the most recent time interval.

7. The method of claim 6, wherein determining that the predicted community feature values are not consistent with observed community feature values during a most recent time interval comprises:

computing a vector distance between a first vector having the predicted community feature values and a second vector having the observed community feature values; and determining that the vector distance satisfies a threshold.

8. The method of claim 7, wherein determining that the predicted community feature values are not consistent with observed community feature values during a most recent time interval comprises:

generating a ranking of communities according to a respective vector distance for each community; and determining that the vector distance for the community is within a number of topranked communities having the largest vector distances.

9. The method of claim 6, further comprising computing the aggregate community feature values from individual user feature values of distinct users in the community.

10. The method of claim 9, wherein computing the aggregate community feature values comprises computing aggregate community feature values from multiple partitions of user nodes within a particular time interval, the multiple partitions being represented by nodes of a subgraph representing the community in the community graph.

11. A system comprising:

one or more computers and one or more storage devices storing instructions that are operable, when executed by the one or more computers, to cause the one or more computers to perform operations comprising:

identifying a user whose behavior is classified as anomalous during a particular time interval;

determining observed community feature values for a community of users of which the user is a member, the community of users being defined by a partition of users in a user graph for the particular time interval, the user graph having nodes that represent distinct users and edges that represent relationships between users from user behavior of the users in the particular time interval;

determining predicted community feature values for the community, the predicted community feature values being determined from a community model generated using aggregate community feature values computed from a community graph having nodes that each represent a partition of a respective user graph within one of multiple time intervals, the community graph having edges between nodes that represent matching partitions of respective user graphs across adjacent time intervals;

determining that the predicted community feature values are consistent with the observed community feature values;

determining observed user feature values of the user during the particular time interval from the user graph for the particular time interval;

determining whether the observed user feature values are consistent with the observed community feature values;

classifying the behavior of the user as not anomalous when the observed user feature values are consistent with the observed community feature values; and classifying the behavior of the user as anomalous when the observed user feature values are not consistent with the observed community feature values.

12. The system of claim 11, wherein the operations further comprise:

determining that the observed user feature values of the user are not consistent with predicted user feature values of the user for the particular time interval.

13. The system of claim 11, wherein the operations further comprise:

generating a user model using user feature values of a node representing the user in one or more of the user graphs; and determining predicted user feature values for the user using the user model, wherein identifying a user whose behavior is classified as anomalous during a particular time interval comprises determining that the observed user feature values during the particular time interval are not consistent with the predicted user feature values during the particular time interval.

14. The system of claim 11, wherein determining whether the observed user feature values are consistent with the observed community feature values comprises:

computing a vector distance between a first vector having the predicted observed user feature values and a second vector having the observed community feature values; and determining whether the vector distance satisfies a threshold.

15. The system of claim 11, wherein determining whether the observed user feature values are consistent with the observed community feature values comprises:

generating a ranking of users according to a respective vector distance for each user, the vector distance for each user representing a measure of consistency of observed user feature values for the user with observed feature values of the user's respective community; and determining that the vector distance for the user is within a number of topranked users having the largest vector distances.

16. A system comprising:

one or more computers and one or more storage devices storing instructions that are operable, when executed by the one or more computers, to cause the one or more computers to perform operations comprising:

receiving data representing aggregate community feature values of a community of users over time, the aggregate community feature values being computed from a community graph having nodes that each represent a partition of a respective user graph within one of multiple time intervals, the community graph having edges between nodes that represent matching partitions of respective user graphs from adjacent time intervals, each user graph having nodes that represent distinct users and edges that represent relationships between users from user behavior of the users in a particular time interval;

determining predicted community feature values for the community, the predicted community feature values being generated by a community model trained on the aggregate community feature values of the community of users over time;

determining that the predicted community feature values are not consistent with observed community feature values during a most recent time interval; and in response to determining that the predicted community feature values are not consistent with observed community feature values during a most recent time interval, classifying behavior of the community as anomalous during the most recent time interval.

17. The system of claim 16, wherein determining that the predicted community feature values are not consistent with observed community feature values during a most recent time interval comprises:

computing a vector distance between a first vector having the predicted community feature values and a second vector having the observed community feature values; and determining that the vector distance satisfies a threshold.

18. The system of claim 17, wherein determining that the predicted community feature values are not consistent with observed community feature values during a most recent time interval comprises:

generating a ranking of communities according to a respective vector distance for each community; and determining that the vector distance for the community is within a number of topranked communities having the largest vector distances.

19. The system of claim 16, wherein the operations further comprise computing the aggregate community feature values from individual user feature values of distinct users in the community.

20. The system of claim 19, wherein computing the aggregate community feature values comprises computing aggregate community feature values from multiple partitions of user nodes within a particular time interval, the multiple partitions being represented by nodes of a subgraph representing the community in the community graph.

* * * * *

UNITED STATES PATENT AND TRADEMARK OFFICE
CERTIFICATE OF CORRECTION

PATENT NO. : 9,747,551 B2
APPLICATION NO. : 14/499693
DATED : August 29, 2017
INVENTOR(S) : Teng Wang, Chunsheng Fang and Derek Chin-Teh Lin Page 1 of 1

It is certified that error appears in the above-identified patent and that said Letters Patent is hereby corrected as shown below:

In the Claims

Column 16, Line 48, in Claim 5: delete "topranked" and insert --top-ranked--, therefor.

Column 17, Line 25, in Claim 8: delete "topranked" and insert --top-ranked--, therefor.

Column 18, Line 45, in Claim 15: delete "topranked" and insert --top-ranked--, therefor.

Column 20, Line 8, in Claim 18: delete "topranked" and insert --top-ranked--, therefor.

Signed and Sealed this
Seventh Day of November, 2017

Joseph Matal
*Performing the Functions and Duties of the*
*Under Secretary of Commerce for Intellectual Property and*
*Director of the United States Patent and Trademark Office*